(12) United States Patent
Natarajan (10) Patent No.: US 10,200,730 B2
(45) Date of Patent: Feb. 5, 2019

(54) METHOD AND SYSTEM FOR FACILITATING DELIVERY OF RECORDED DATA OVER A NETWORK

(71) Applicant: Wipro Limited, Bangalore (IN)

(72) Inventor: Gowrishankar Subramaniam Natarajan, Chennai (IN)

(73) Assignee: Wipro Limited, Bangalore (IN)

(*) Notice: Subject to any disclaimer, the term of this patent is extended or adjusted under 35 U.S.C. 154(b) by 79 days.

(21) Appl. No.: 15/270,011

(22) Filed: Sep. 20, 2016

(65) Prior Publication Data

US 2018/0027273 A1 Jan. 25, 2018

(30) Foreign Application Priority Data

Jul. 25, 2016 (IN) .............................. 201641025411

(51) Int. Cl.
*H04N 7/173* (2011.01)
*H04N 21/262* (2011.01)
(Continued)

(52) U.S. Cl.
CPC ....... *H04N 21/262* (2013.01); *H04N 21/2181* (2013.01); *H04N 21/2225* (2013.01); *H04N 21/235* (2013.01); *H04N 21/2393* (2013.01); *H04N 21/23109* (2013.01); *H04N 21/2402* (2013.01); *H04N 21/2407* (2013.01); *H04N 21/2665* (2013.01); *H04N 21/4334* (2013.01); *H04N 21/4532* (2013.01); *H04N 21/472* (2013.01); *H04N 21/4788* (2013.01);
(Continued)

(58) Field of Classification Search
CPC ..................... H04N 21/2393; H04N 21/47202
See application file for complete search history.

(56) References Cited

U.S. PATENT DOCUMENTS 8,589,993 B2 * 11/2013 Ramaswami ...... H04N 21/4788
709/204
2003/0204856 A1 * 10/2003 Buxton .............. H04N 7/17318
725/120

(Continued)

OTHER PUBLICATIONS

European Search Report from the European Patent Office in counterpart European Application No. 16196188.3, dated Mar. 23, 2017, 7 pages.

*Primary Examiner* — Gigi L Dubasky
(74) *Attorney, Agent, or Firm* — Finnegan, Henderson, Farabow, Garrett & Dunner LLP (57) ABSTRACT

The present disclosure relates to a method and system for facilitating the delivery of recorded data over a network by a data delivery data. The data delivery system receives user request from at least one requesting user device for viewing recorded data and also one or more parameters from at least one requesting user device and a plurality of recording user devices. Based on the received one or more parameters the data delivery system determines a set of recording user devices from the plurality of recording user devices and initiates delivery of recorded data from the set of the recording user devices to the at least one requesting user device. The data delivery system monitors progress of the delivery at predefined intervals of time and re-initiates the delivery of one or more segments of the recorded data based on the monitoring for facilitating delivery of recorded data over a network.

18 Claims, 5 Drawing Sheets

(51) Int. Cl.
*H04N 21/235* (2011.01)
*H04N 21/433* (2011.01)
*H04N 21/472* (2011.01)
*H04N 21/45* (2011.01)
*H04N 21/24* (2011.01)
*H04N 21/218* (2011.01)
*H04N 21/2225* (2011.01)
*H04N 21/231* (2011.01)
*H04N 21/239* (2011.01)
*H04N 21/2665* (2011.01)
*H04N 21/4788* (2011.01)
*H04N 21/63* (2011.01)
*H04N 21/475* (2011.01)
*H04N 21/81* (2011.01)

(52) U.S. Cl.
CPC ....... *H04N 21/632* (2013.01); *H04N 21/4755* (2013.01); *H04N 21/812* (2013.01)

(56) References Cited

U.S. PATENT DOCUMENTS

| | | | |
|---|---|---|---|
| 2005/0177853 A1* | 8/2005 | Williams | H04N 21/2181 725/81 |
| 2005/0188078 A1 | 8/2005 | Kotzin et al. | |
| 2007/0079342 A1* | 4/2007 | Ellis | H04N 5/913 725/89 |
| 2009/0106393 A1* | 4/2009 | Parr | H04L 63/0428 709/218 |
| 2010/0011103 A1* | 1/2010 | Luzzatti | H04L 29/06027 709/226 |
| 2010/0303054 A1* | 12/2010 | Yang | H04L 1/1825 370/345 |
| 2014/0289203 A1 | 9/2014 | Chan et al. | |
| 2015/0103885 A1* | 4/2015 | Feng | H04N 19/107 375/240.02 |

* cited by examiner

METHOD AND SYSTEM FOR FACILITATING DELIVERY OF RECORDED DATA OVER A NETWORK

FIELD OF THE INVENTION

The present subject matter is related in general to the field of data delivery, more particularly, but not exclusively to a method and system for facilitating delivery of recorded data over a network.

BACKGROUND

In the recent years, communication technology has undergone explosive growth. With this growth, media technology like Multi-Programming Video Distributors (MPVD) took advantage from the content delivery networks and the streaming technologies like adaptive bit-rate streaming for accelerating the delivery of video and other data to their subscribers. Today, users have the ability to schedule, record and view videos and other data practically from any device platforms such as Set Top Box (STB), video gateway, mobiles, web etc. Along with this ability, the users can also view the recorded content from anywhere and any device.

In the existing scenario, with all the access to anytime and anywhere recording, users may still not be able to view their data if they forget to schedule the recording on the device. In such scenarios, a catch-up service is offered by the service providers through a subscription or for additional fees. Also, users may search their missed data manually through demand and on other video and content catalogues. In some cases, there may be no way to watch the data resulting in disappointment of users. In addition, the existing technology do not provide any mechanism to reliably discover the required contents that exists with other users who are willing to share and stream content stored with them.

Thus, the existing technologies which provide the recorded data anytime and anywhere may not be efficient in providing all the requested data with good quality of service. The catchup services provided in the existing technique is based on the perception of popularity and not tuned to the users viewing preference. Also, the copyright laws in some countries require single copy of the content to be stored in cloud. This creates problem in delivering recorded content with guaranteed quality of service resulting in high cost of delivery for the service provider and poor quality of service to users. Thus, there is a need for a system which facilitates and monitors the delivery of recorded data over a network.

SUMMARY

In an embodiment, the present disclosure relates to a method for facilitating the delivery of recorded data over a network. The method comprises receiving user request from at least one requesting user device for viewing recorded data, receiving one or more parameters from the at least one requesting user device and a plurality of recording user devices, determining a set of recording user devices from the plurality of recording user devices based on the received one or more parameters, initiating delivery of recorded data from the set of the recording user devices to the at least one requesting user device, monitoring t progress of the delivery of recorded data at predefined intervals of time and re-initiating the delivery of one or more segments of the recorded data based on the monitoring for facilitating delivery of recorded data over a network.

In an embodiment, the present disclosure relates to a data delivery system for facilitating the delivery of recorded data over a network. The data delivery system comprises a processor and a memory communicatively coupled to the processor, wherein the memory stores processor executable instructions, which, on execution, causes the data delivery system to receive user request from at least one requesting user device for viewing recorded data, receive one or more parameters from the at least one requesting user device and a plurality of recording user devices, determine a set of recording user devices from the plurality of recording user devices based on the received one or more parameters, initiate delivery of recorded data from the set of the recording user devices to the at least one requesting user device, monitor progress of the delivery of recorded data at predefined intervals of time and re-initiate the delivery of one or more segments of the recorded data based on the monitoring for facilitating delivery of recorded data over a network.

In an embodiment, the present disclosure relates to a non-transitory computer readable medium including instructions stored thereon that when processed by at least one processor cause a data delivery system to receive user request from at least one requesting user device for viewing recorded data, receive one or more parameters from the at least one requesting user device and a plurality of recording user devices, determine a set of recording user devices from the plurality of recording user devices based on the received one or more parameters, initiate delivery of recorded data from the set of the recording user devices to the at least one requesting user device, monitor progress of the delivery of recorded data at predefined intervals of time and re-initiate the delivery of one or more segments of the recorded data based on the monitoring for facilitating delivery of recorded data over a network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method for facilitating the delivery of recorded data over a network. The present disclosure provides a data delivery system which facilitates the delivery of the recorded data by initiating delivery of recorded data and by monitoring the progress of the delivery. In an embodiment, the data delivery system ensures a better quality of service of the data delivered from a number of recording user devices to a requesting user device. The quality of service is ensured by monitoring a number of parameters associated with the recording and requesting user devices. In an embodiment, the recording and requesting user devices are Customer Premise Equipment (CPE) devices such as a set top box, video gateway etc., within a communication network. The present disclosure determines a set of recording user devices from the plurality of recording devices based on the one or more parameters. The data delivery system initiates the delivery of recorded data from the set of the recording user devices. The data delivery system ensures maximum throughput based on the optimum network bandwidth and device availability at the time of the request to ensure better quality of service. The quality of service is maintained by monitoring progress of delivery of the recorded data. In an embodiment, the progress of the delivery is monitored dynamically based on any notification of failed reception.

Figure 1:
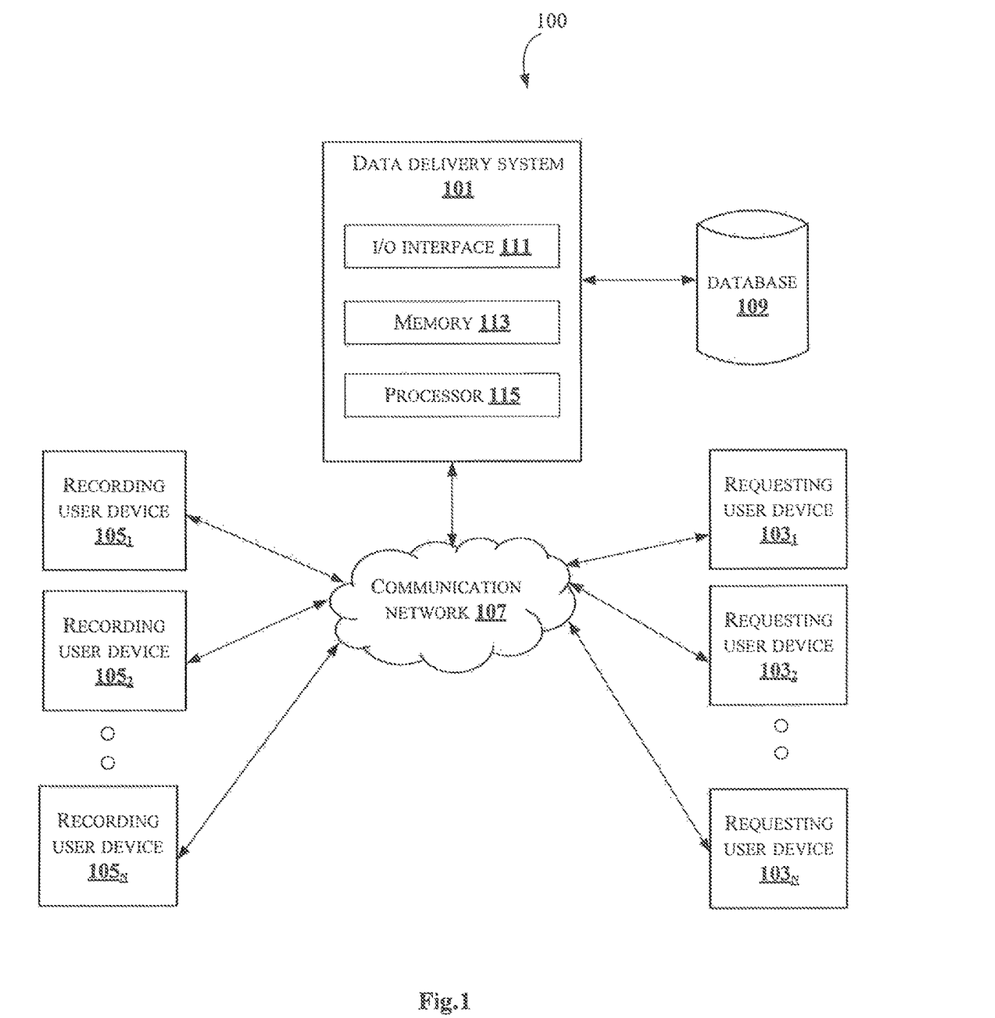
FIG. 1 illustrates an exemplary environment for facilitating delivery of recorded data over a network in accordance with some embodiments of the present disclosure.

As shown in FIG. 1, the environment 100 comprises a data delivery system 101, a requesting user device $103_1$, requesting user device $103_2$, . . . , requesting user device $103_N$ (collectively referred as requesting user device 103) and a recording user device $105_1$, recording user device $105_2$ . . . recording user device $105_N$ (collectively referred as plurality of recording user devices 105) connected through a wired or wireless communication network 107. The data delivery system 101 is also connected to a database 109. In an embodiment the requesting user device 103 and the recording user devices 105 include, but are not limited to, Set Top Box (STB), mobile phones, laptops, computers, video gateway and any other computing device. The data delivery system 101 receives a request for viewing any recorded data from at least one of the requesting user device 103. Further, the data delivery system 101 also receives one or more parameters from the at least one requesting user device 103 and the plurality of recording user devices 105. The one or more parameters comprise, but are not limited to, location data of the requesting user device 103 and plurality of recording user devices 105, user information of the at least one requesting user device, network data, Central Processing Unit (CPU) usage of the plurality of recording user devices, time and duration of the recorded data, and content information. The one or more parameter details are stored in the database 109. In an embodiment, apart from the recorded data, the data delivery system 101 also delivers some additional data along with the recorded data based on the time of the request by the requesting user device 103, location of the requesting device 103, and user preferences. The additional data may comprise for example, advertisements based on users' viewership profile. Further, the data delivery system 101 determines a set of recording user devices from the plurality of recording user devices 105 based on the one or more parameters received. The data delivery system 101 initiates the delivery of recorded data from the set of the recording user devices to the at least one requesting user device 103. The delivery of the recorded data is further monitored by the data delivery system 101 to ensure better data quality of service.

The data delivery system 101 comprises an I/O Interface 111, a memory 113 and a processor 115. The I/O interface 111 is configured to receive a request from at least one requesting user device 103 for viewing the recorded content. The I/O interface 111 also receives one or more parameters from the at least one requesting user device 103 and the plurality of the recording user devices 105.

The received information from the I/O interface 111 is stored in the memory 113. The memory 113 is communicatively coupled to the processor 115 of the data delivery system 101. The memory 113 also stores processor instructions which cause the processor 115 to execute the instruction in order to facilitate the delivery of recorded data.

Figure 2:
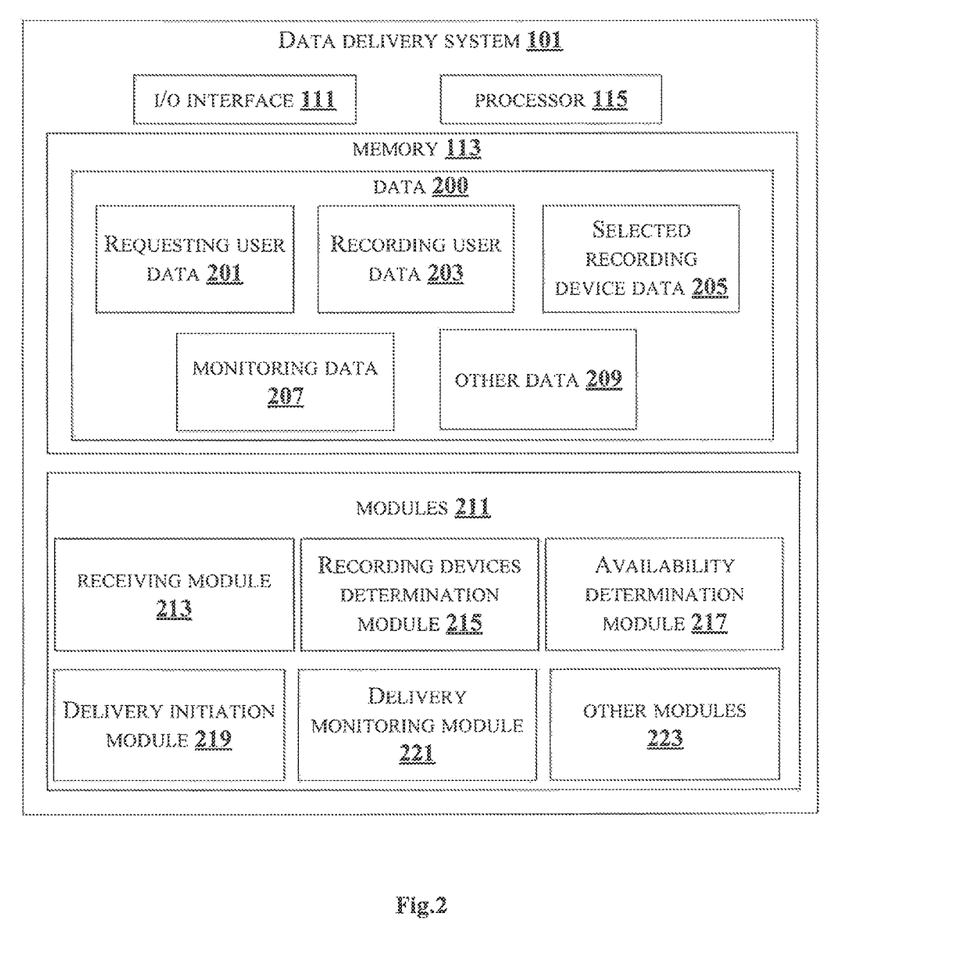
FIG. 2 shows a detailed block diagram of a data delivery system in accordance with some embodiments of the present disclosure.

FIG. 2a shows a detailed block diagram of a data delivery system in accordance with some embodiments of the present disclosure.

One or more data 200 and one or more modules 211 of the data delivery system 101 are described herein in detail. In an embodiment, the one or more data 200 comprises requesting user data 201, recording user data 203, selected recording device data 205, monitoring data 207 and other data 209 for facilitating delivery of recorded data over a network.

The requesting user data 201 comprises information about the user requests from at least one requesting user device 103. The requesting user devices 103 request for viewing recorded content which may not be present with them. The requesting user data 201 also comprises information about the location details of the requesting user device 103, which comprises both geographical as well as network wise location details. Further, the requesting user data 201 comprises user information of the requesting user device 103, network information of the requesting user device 103, which may comprise network path, network bandwidth and traffic details. The requesting user data 201 further comprise details about the duration and time of the request made by the requesting user device 103. The requesting user data 201 helps in identifying the set of recorded user devices for delivery of data.

The recording user data 203 comprises information about the one or more parameters of the plurality of recording user devices 105. The one or more parameters comprise location data of the plurality of recording user devices 105, network data associated with the plurality of recording user devices 105. For example, the network data may comprise information about the network links of the recording user devices, number of current connections at each of the recording user device, network path, network bandwidth information and the traffic details of the plurality of recording user devices 105. Further, the one or more parameters of the plurality of recording user devices 105 comprise Central Processing Unit (CPU) usage of the plurality of recording user devices 105, time and duration of the recorded data, and content information. In an embodiment, the recording user data 203 also comprises metadata associated with the recorded data such as video format in which the recording content is stored etc.

The selected recording device data 205 comprises information about the set of recording user devices which are selected for initiating the delivery of recorded data. The set of the recording user devices are selected from the plurality of recording user devices 105 as the set of the selected recording device is determined to be suitable for transmitting the recorded data efficiently. The selection of the set of recording user devices is carried out based on the proximity, network conditions of the recording and requesting user device 103, time and duration of the recording and request data and content information.

The monitoring data 207 comprises information about the progress of the delivery of the recorded data. In an embodiment, the progress of the delivery of the recorded data is monitored at pre-defined intervals of time. The monitoring data 207 comprises current network details of the set of the recording user devices delivering the recorded data and the requesting user device 103 which is receiving the recorded data. For example, the uplink network conditions of the set of the recording user devices enabling the set of recording user devices to deliver or stream data segments and the downlink network conditions of the requesting user device 103 which is receiving the data segments. Further, the monitoring data 207 comprises current location details of the set of the recording user devices and requesting user device 103 and information about the data segments which are transferred and are initiated for transferring. The monitoring data 207 comprises notification updates on the progress of the delivery of recorded data from both requesting user device 103 and the plurality of recording user devices 105. Further, the monitoring data 207 also comprises information about the lost or missed one or more segments of the recorded data.

The other data 209 may store data, including temporary data and temporary files, generated by modules for performing the various functions of the data delivery system 101.

In an embodiment, the one or more data 200 in the memory 113 are processed by the one or more modules 211 of the data delivery system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

In one implementation, the one or more modules 211 may include, for example, receiving module 213, a recording devices determination module 215, availability determination module 217, delivery initiation module 219 and a delivery monitoring module 221.

The one or more modules 211 may also comprise other modules 223 to perform various miscellaneous functionalities of the data delivery system 101. It will be appreciated that such aforementioned modules may be represented as a single module or a combination of different modules.

The receiving module 213 receives a user request from at least one requesting user device 103 for viewing the recorded data. Further, the receiving module 213 also receives the one or more parameters from the at least one requesting user device 103 and the plurality of the recording user devices 105.

The recording devices determination module 215 determines a set of the recording user devices which are used for delivering the recorded data. The recording device determination module 215 determines the set of recording user devices based on the one or more parameters of the requesting user device 103 and the plurality of recording user devices 105. The recording devices determination module 215 determines the set of the recording user devices for the requesting user device 103 by determining the proximity of the requesting user device 103 with the set of the recording user device, Control Processing Unit usage of the plurality of recording user devices 105 at the time of recording, network details, time and duration of the recording and request, current network connection of the plurality of recording user devices 105 and content information. The recording devices determination module 215 receives the content information, for example, metadata and format of the recorded content from the database 109. In an embodiment, the recording devices determination module 215 determines "n" set of recording user devices which are kept as backup recording user devices for delivery of recorded data.

The availability determination module 217 determines the availability of the set of the recording user devices selected for delivery of the recorded data. Once the set of the recording user devices are determined, the availability determination module 217 determines the availability by sending a request to each recording device in the set of the recording user devices. The request is sent to the set of the recording user devices for hosting the requesting user device 103. The delivery of the requested data to the requesting user device 103 is initiated once the set of the recording user devices accept the request. In an embodiment, if the set of the determined recording user devices do not accept the request for hosting the requesting user device 103, the availability determination module 217 sends a request to the next set of the recording user devices which are kept for backup and are also determined based on the one or more parameters.

The delivery initiation module 219 initiates the delivery of the recorded data from the set of the recording user devices to the at least one requesting user device 103. In an embodiment, the delivery initiation module 219 sends a start notification to the requesting user device 103 before the delivery session is initiated for receiving the segments of recorded data. In an embodiment, each of the recording user devices in the set of the recording user devices delivers a segment of recorded data to the requesting user device 103. Further, since each of the devices in the set of the recording user device is sending only small segments of the recorded data, the load on the uplink network is minimal.

The delivery monitoring module 221 manages and monitors the initiated delivery of recorded data between the set of the recording user devices and the at least one requesting user device 103. The recorded data is delivered by sending the recorded data in segments to the requesting user device. In an embodiment, the requesting user device 103 arranges the received segments of the recorded data. The delivery monitoring module 221 monitors the progress of the delivery by monitoring the content information, network data and location data of the at least one requesting user device 103 and the set of the recording user devices. Based on the progress of the delivery, the delivery monitoring module 221 determines any lost or missing segments of the recorded data and requests the delivery initiation module 219 for re-initiation of the lost and missed data segments. Upon receiving the re-initiation request, the delivery initiation module 219 re-initiates the delivery of the lost and missed segments of the recorded data from the set of the recording user devices to the requesting user device 103. The corresponding set of the recording device delivers the lost and the missed segments of the recorded data to the requesting user device 103. Further, the delivery monitoring module 219 receives notification on the progress of the delivery from both the set of the recording user devices and the requesting user device 103.

Figure 3A:
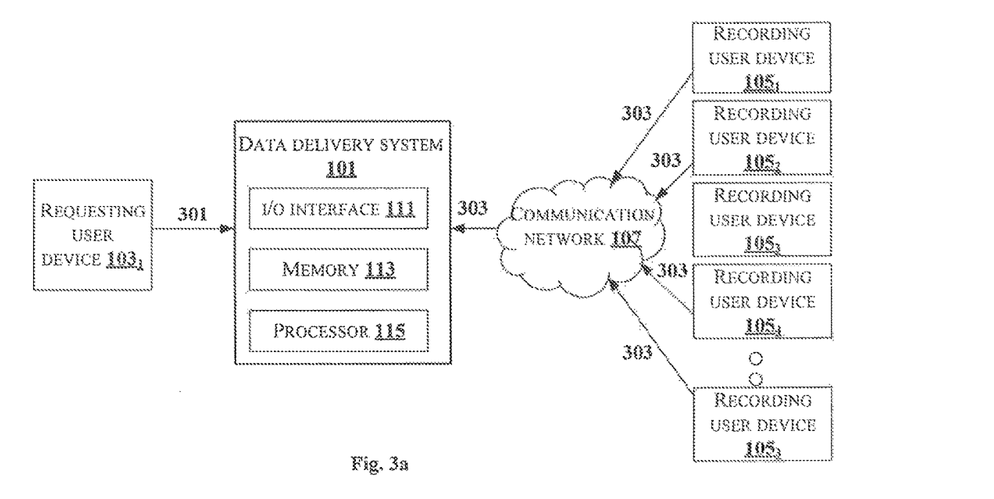
FIG. 3a and FIG. 3b show an exemplary sequence of facilitating delivery of recorded data in accordance with some embodiments of the present disclosure.
Figure 3B:
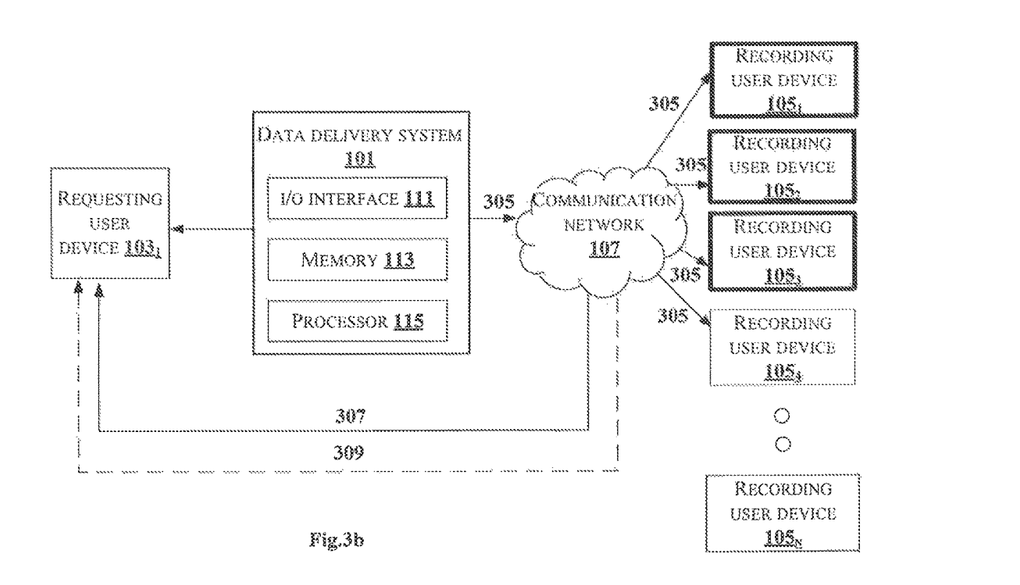

FIG. 3a and FIG. 3b shows an exemplary sequence of facilitating delivery of recorded data in accordance with some embodiment of the present disclosure.

As shown in FIG. 3a and FIG. 3b, the environment illustrates the sequence of steps for facilitating the delivery of recorded data according to an exemplary embodiment of the present disclosure. The environment 300 comprises a data delivery system 101 connected to a requesting user device $103_1$, through a communication network (not shown in fig). The data delivery system 101 is also connected to a plurality of recording user devices 105 through a communication network 107. As shown in FIG. 3a, at 301, the requesting user device $103_1$ sends a request to the data delivery system 101 for viewing recorded data. In addition to the request, the data delivery at 301 also receives one or more parameters associated with the requesting user device $103_1$. After receiving the request, the data delivery system checks the plurality of recording user devices 105 denoted as recording user device $105_1$, recording user device $105_2$ ... recording user device $105_N$. The data delivery system 101 at 303 receives the one or more parameters associated with the plurality of the recording user devices 105. The plurality of recording user device 105 may comprise the recording which is requested by the requesting user device $103_1$. Once the parameters associated with the plurality of recording user devices 105 are received, the data delivery system 101 determines a set of recording user devices based on the one or more parameters of the plurality of recording user devices 105 and the requesting user device $103_1$. In FIG. 3b, the data delivery system 101 determines the set of the recording user devices (indicated as highlighted recording user devices 105) as recording user device $105_1$, recording user device $105_2$ ... $105_3$. The set of the recording user devices is determined based on the proximity of location with the requesting user device $103_1$, network conditions of the recording user devices and requesting user device $103_1$, time and duration of the request and record etc. Upon determining the set of the recording user devices, the data delivery system 101 sends request for initiating the delivery of recorded data from the highlighted recording user devices as indicated in 305. Each of the highlighted recording user device sends the recorded data to the requesting user device $103_1$ as indicated in 307. Each of the recording user devices $105_1$, ... recording user device $105_3$ sends segments of recorded data to the requesting user device $103_1$. Further, the data delivery system 101 dynamically manages and monitors the progress of the delivery of the recorded data based on the one or more parameters. For example, if the recording user device $105_3$ deviates from the original network and physical condition and the corresponding recorded segment are not delivered, the data delivery re-initiates the delivery of the one or more lost or missed segments of the recorded data to the requesting user device $103_1$ indicated in 309.

Figure 4:
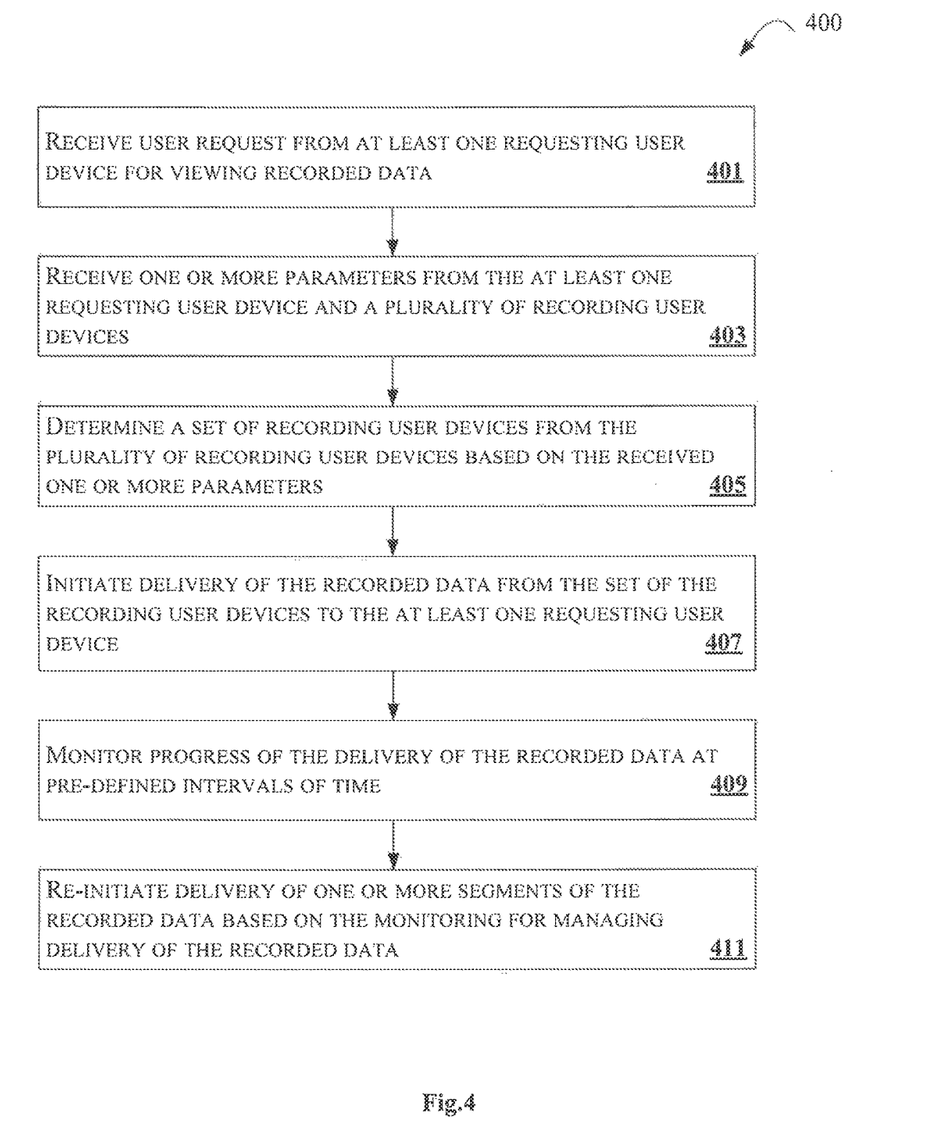
FIG. 4 illustrates a flowchart showing a method for facilitating delivery of recorded data over a network in accordance with some embodiments of present disclosure.

FIG. 4 illustrates a flowchart showing a method for facilitating delivery of recorded data over a network in accordance with some embodiments of present disclosure.

As illustrated in FIG. 4, the method 400 comprises one or more blocks for facilitating delivery of recorded data over a network. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401 the data delivery system 101 receives user request from at least one requesting user device for viewing recorded data.

At block 403 the data delivery system 101 receives one or more parameters from the at least one requesting user device and a plurality of recording user devices 105. In an embodiment, one or more parameters comprise location data, user information of the at least one requesting user device, network data, Central Processing Unit (CPU) usage of the plurality of recording user devices, time and duration of the recorded data, and content information.

At block 405 the data delivery system 101 determines a set of recording user devices from the plurality of recording user devices 105 based on the received one or more parameters. Upon determining the set of the recording user devices, the data delivery system 101 determines the availability of the set of the recording user devices by sending a request to the set of the recording user devices for hosting the at least one requesting user device.

At block 407 the data delivery system 101 initiates delivery of recorded data from the set of the recording user devices to the at least one requesting user device, where, the delivery of the requested data is initiated upon determining the availability of the set of the recording user devices.

At block 409 the data delivery system 101 monitors the progress of the delivery data at pre-defined intervals of time. In an embodiment, the data delivery system 101 monitors the progress of the delivery by monitoring the content information, network data and location data of the at least one requesting user device and the set of the recording user devices.

At block 411 the data delivery system 101 re-initiates the delivery of one or more segments of the recorded data based on the monitoring for facilitating the delivery of recorded data over a network. In an embodiment, in addition to the recorded data, the data delivery system 101 also delivers additional data based on the time of the request by the requesting user device 103, location of the requesting device 103, and user preferences. The additional data may comprise for example, advertisements based on users' viewership profile etc.

Computing System

Figure 5:
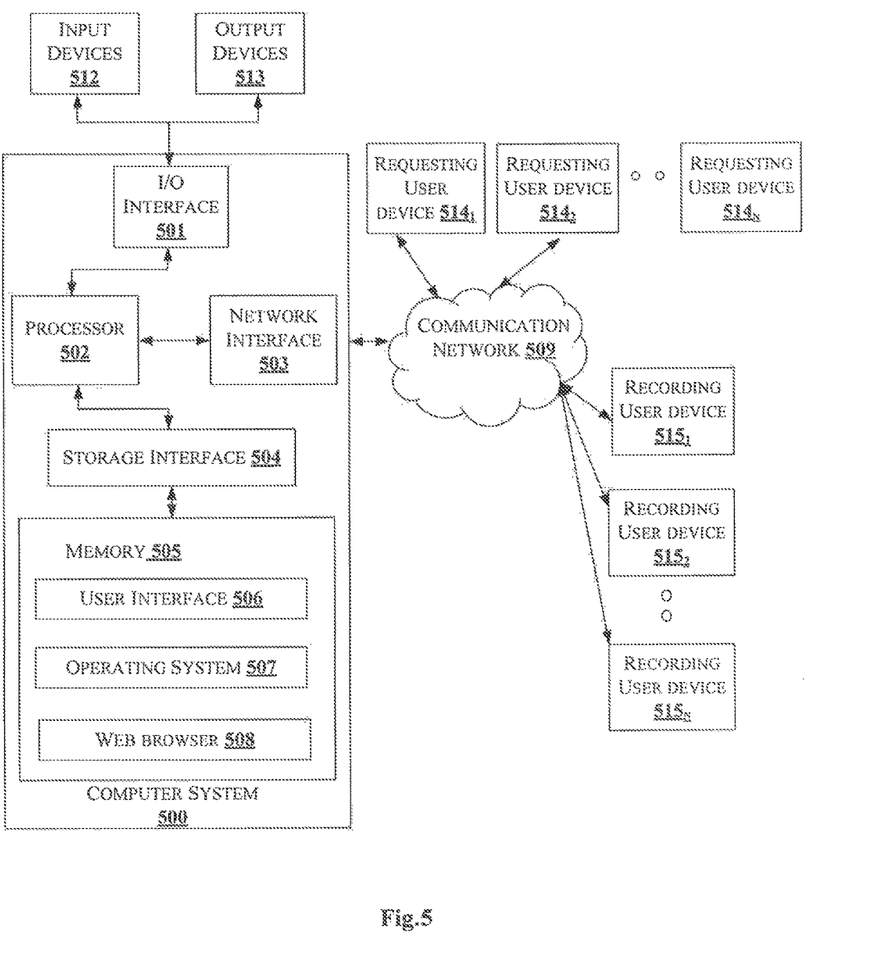
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the data delivery system. The computer system 500 may comprise a central processing unit ("CPU" or "processor") 502. The processor 502 may comprise at least one data processor for facilitating delivery of recorded data. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of a data delivery system. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with requesting user devices 514 and recording user devices 515. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web browser 508 etc. In some embodiments, computer system 500 may store user/application data 506, such as the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure facilitates an efficient and optimal delivery of recorded data to the requesting users.

The present disclosure provides an effective video quality of service to the requesting user devices.

An embodiment of the present disclosure provides ability to watch the recording instantly or store the recording.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Data delivery system |
| 103 | Requesting user device |
| 105 | Recording user devices |
| 107 | Communication system |
| 109 | Database |
| 111 | I/O interface |
| 113 | Memory |
| 115 | Processor |
| 200 | Data |
| 201 | Requesting user data |
| 203 | Recording user data |
| 205 | Selected recording device data |
| 207 | Monitoring data |
| 209 | Other data |
| 211 | Modules |
| 213 | Receiving module |
| 215 | Recording devices determination module |
| 217 | Availability determination module |
| 219 | Delivery initiation module |
| 221 | Delivery monitoring module |
| 223 | Other modules |

What is claimed is:

1. A method for facilitating delivery of recorded data over a network, the method comprising:
   receiving, by a data delivery system, user request from at least one requesting user device for viewing recorded data;
   receiving, by the data delivery system, one or more parameters from the at least one requesting user device and a plurality of recording user devices;
   determining, by the data delivery system, a set of recording user devices from the plurality of recording user devices based on the received one or more parameters;
   initiating, by the data delivery system, delivery of recorded data from the set of the recording user devices to the at least one requesting user device;
   monitoring, by the data delivery system, progress of the delivery of the recorded data at predefined intervals of time, wherein the monitoring comprises monitoring uplink network conditions of the set of the recording user devices and downlink network conditions of the at least one requesting user device;
   determining, by the data delivery system, one or more lost segments and one or more missing segments of the recorded data based on the monitoring; and
   selectively re-initiating, by the data delivery system, the delivery of the one or more lost segments and the one or more missing segments of the recorded data from the set of the recording user devices for facilitating delivery of the recorded data over the network based on the uplink network conditions of the set of the recording user devices and the downlink network conditions of the at least one requesting user device, wherein along with the recorded data, additional data is provided to the at least one requesting user device based on at least one of a time of the user request and a location of the at least one requesting user device.

2. The method as claimed in claim 1, wherein the one or more parameters comprises location data, user information of the at least one requesting user device, network data, Central Processing Unit (CPU) usage of the plurality of recording user devices, time and duration of the recorded data, and content information.

3. The method as claimed in claim 2, wherein the additional data is further based on a user profile, and wherein the additional data comprises one or more advertisements.

4. The method as claimed in claim 1, wherein monitoring the progress of the delivery comprises monitoring the content information, network data and location data of the at least one requesting user device and the set of the recording user devices.

5. The method as claimed in claim 1, wherein initiating the delivery of requested data comprises determining availability of the set of the recording user devices.

6. The method as claimed in claim 5, wherein determining the availability of the set of the recording user devices comprises sending a request to the set of the recording user devices for hosting the at least one requesting user device.

7. A data delivery system for facilitating delivery of recorded data over a network comprising:
   a processor; and
   a memory communicatively coupled to the processor, wherein the memory stores processor instructions, which, on execution, causes the processor to:
      receive user request from at least one requesting user device for viewing recorded data;
      receive one or more parameters from the at least one requesting user device and a plurality of recording user devices;
      determine a set of recording user devices from the plurality of recording user devices based on the received one or more parameters;
      initiate delivery of recorded data from the set of the recording user devices to the at least one requesting user device;
      monitor progress of the delivery of the recorded data at predefined intervals of time, wherein the monitoring comprises monitoring uplink network conditions of the set of the recording user devices and downlink network conditions of the at least one requesting user device;
      determine one or more lost segments and one or more missing segments of the recorded data based on the monitoring; and
      selectively re-initiate the delivery of the one or more lost segments and the one or more missing segments of the recorded data from the set of the recording user devices for facilitating delivery of the recorded data over the network based on the uplink network conditions of the set of the recording user devices and the downlink network conditions of the at least one requesting user device, wherein along with the recorded data, additional data is provided to the at least one requesting user device based on at least one a of time of the user request and a location of the at least one requesting user device.

8. The data delivery system as claimed in claim 7, wherein the one or more parameters comprise location data, user information of the at least one requesting user device, network data, Central Processing Unit (CPU) usage of the plurality of recording user devices, time and duration of the recorded data, and content information.

9. The data delivery system as claimed in claim 8, wherein the additional data is further based on a user profile, and wherein the additional data comprises one or more advertisements.

10. The data delivery system as claimed in claim 7, wherein the processor monitors the progress of the delivery by monitoring the content information, network data and location data of the at least one requesting user device and the set of the recording user devices.

11. The data delivery system as claimed in claim 7, wherein the processor initiates the delivery of the requested data by determining availability of the set of the recording user devices.

12. The data delivery system as claimed in claim 11, wherein the processor determines the availability of the set of the recording user devices by sending a request to the set of the recording user devices for hosting the at least one requesting user device.

13. A non-transitory computer readable medium including instruction stored thereon that when processed by at least one processor cause a data delivery system to perform operation comprising:
   receiving user request from at least one requesting user device for viewing recorded data;
   receiving one or more parameters from the at least one requesting user device and a plurality of recording user devices;
   determining a set of recording user devices from the plurality of recording user devices based on the received one or more parameters;
   initiating delivery of recorded data from the set of the recording user devices to the at least one requesting user device;
   monitoring progress of the delivery of the recorded data at predefined intervals of time, wherein the monitoring comprises monitoring uplink network conditions of the set of the recording user devices and downlink network conditions of the at least one requesting user device;
   determining one or more lost segments and one or more missing segments of the recorded data based on the monitoring; and
   selectively re-initiating the delivery of the one or more lost segments and the one or more missing segments of the recorded data from the set of the recording user devices for facilitating delivery of the recorded data over the network based on the uplink network conditions of the set of the recording user devices and the downlink network conditions of the at least one requesting user device, wherein along with the recorded data, additional data is provided to the at least one requesting user device based on at least one of a time of the user request and a location of the at least one requesting user device.

14. The medium as claimed in claim 13, wherein the one or more parameters comprise location data, user information of the at least one requesting user device, network data, Central Processing Unit (CPU) usage of the plurality of recording user devices, time and duration of the recorded data, and content information.

15. The medium as claimed in claim 14, wherein the additional data is further based on a user profile, and wherein the additional data comprises one or more advertisements.

16. The medium as claimed in claim 13, wherein the instruction causes the processor to monitor the progress of the delivery by monitoring the content information, network data and location data of the at least one requesting user device and the set of the recording user devices.

17. The medium as claimed in claim 13, wherein the instruction causes the processor to initiate the delivery of the requested data by determining availability of the set of the recording user devices.

18. The medium as claimed in claim 17, wherein the instruction causes the processor to determine the availability of the set of the recording user devices by sending a request to the set of the recording user devices for hosting the at least one requesting user device.

* * * * *